United States Patent [19]

Kim

[11] Patent Number: 5,583,491
[45] Date of Patent: Dec. 10, 1996

[54] METHOD FOR DISPLAYING STATE OF REMOTE CONTROLLER BATTERY ON A TELEVISION SET

[75] Inventor: Soon D. Kim, Seoul, Rep. of Korea

[73] Assignee: Samsung Electronics Co., Ltd., Kyungki-do, Rep. of Korea

[21] Appl. No.: 351,094

[22] Filed: Nov. 30, 1994

[30] Foreign Application Priority Data

Nov. 30, 1993 [KR] Rep. of Korea .................. 93-25899

[51] Int. Cl.⁶ ................................................ H04Q 1/00
[52] U.S. Cl. ................. 340/825.72; 340/663; 348/569
[58] Field of Search ..................... 340/825.72, 825.69, 340/660, 663; 348/734, 569

[56] References Cited

U.S. PATENT DOCUMENTS

| | | | |
|---|---|---|---|
| 4,764,981 | 8/1988 | Miyahara | 340/825.72 |
| 4,959,721 | 9/1990 | Micic | 340/825.69 |
| 5,003,396 | 3/1991 | Kang | 348/734 |
| 5,237,417 | 8/1993 | Hayashi | 348/569 |
| 5,239,540 | 8/1993 | Rovira . | |
| 5,307,055 | 4/1994 | Baskin | 348/734 |
| 5,410,326 | 4/1995 | Goldstein | 340/825.72 |
| 5,455,570 | 10/1995 | Cook | 340/825.72 |

OTHER PUBLICATIONS

8–in–1 Universal Remote Control, Tandy Corp, 1990.

*Primary Examiner*—Brian Zimmerman
*Attorney, Agent, or Firm*—Sughrue, Mion, Zinn, Macpeak & Seas

[57] ABSTRACT

When the remote controller battery is exhausted to a low state, the state is detected and displayed on a display device located at the apparatus which is controlled by the commands from the remote controller. The voltage state of the battery is detected upon the actuation of a key of the remote controller. If a low state is detected, a low battery data code is added to the command code generated as a result of actuation of the key, and both kinds of data are transmitted to the controlled electronic device. The transmitted data is received at the controlled electronic device. The low battery data is detected and displayed on a display device of the remotely controlled electronic device.

15 Claims, 3 Drawing Sheets

5,583,491

METHOD FOR DISPLAYING STATE OF REMOTE CONTROLLER BATTERY ON A TELEVISION SET

BACKGROUND OF THE INVENTION

The present invention relates to a method for displaying the state of a battery in a remote control device, such that when the battery power is reduced to below a predetermined voltage level, this condition is detected and displayed in the electronic apparatus, which is controlled by the remote controller.

Remote controllers are widely used on home appliances, and most of the remote controllers are equipped with batteries. If a remote controller is used for a long time, the power of the battery will become exhausted, such that the remote controller cannot function in the normal manner.

Because of such circumstances, conventionally a remote controller is provided with a liquid crystal display (LCD) or a light emitting diode (LED) to display the state of the battery. However, the user does not always watch the remote controller display and therefore will not always see the indication of reduced or exhausted battery power.

As a result of the state of the battery being displayed in a position often not noticed by the user, the user's first response to exhausted battery conditions is to assume that the electronic appliance is not working properly due to some malfunction, and the user will often contact a repair person to service the electronic appliance. Alternatively, the user may complain to the manufacturer of the electronic apparatus.

Another problem with the conventional remote control display of battery power is that the remote controller has to include a display, which increases the manufacturing cost of the device.

Japanese Patent Application Laid-Open No. Heisei-5-168068 (laid open on Jul. 2, 1993), entitled "Electronic Apparatus Provided with a Power Source State Checking Function", discloses an electronic apparatus, in which all the functions are controlled by a remote controller, and the state of a portable power source of the apparatus can be displayed on the remote controller, if the remote controller requests so. The main body of the apparatus, i.e. the controlled electronic apparatus, and the remote controller are capable of mutual transmission and reception of signals. If there is a request for a battery check from the remote controller to the main body, the main body detects the state of its battery and transmits a signal to the remote controller to indicate to the remote controller the state of the main body battery. The remote controller displays the received battery state data on the remote controller itself. However, this feature does not solve the above problem of the display and recognition of the battery power of the remote controller, itself.

SUMMARY OF THE INVENTION

The present invention is intended to overcome the above-described disadvantages of the prior art.

Therefore, it is an object of the present invention to provide a method and apparatus for displaying the state of a remote controller battery, in which, the low voltage state of the remote controller battery is detected, the detected state is transmitted to the electronic apparatus as an encoded signal, and the apparatus decodes the data and displays the received data on a display device of the apparatus, so that the user should be able to determine when the battery needs to be replaced.

In achieving the above object, the apparatus and method for displaying the remote controller battery according to the present invention carries out the steps of detecting the state of the battery in response to depressing a particular key on the remote control key board, transmitting to the electronic apparatus controlled by the remote controller a signal indicating the condition of the battery when the condition is a low battery state, and decoding the received signal in the apparatus, and displaying the information about the remote controller battery on a display of the apparatus.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
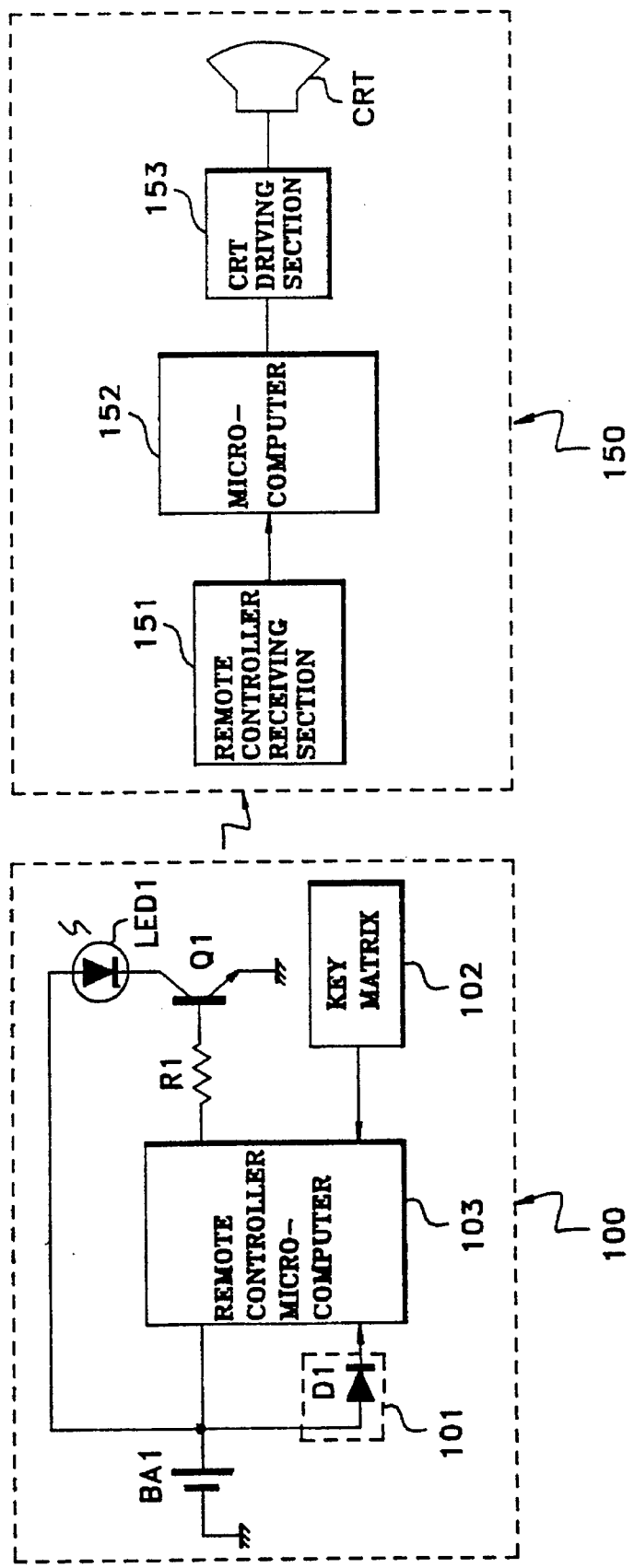
FIG. 1 is a block diagram showing the constitution of the circuit for displaying the battery state according to the present invention.

FIG. 1 is a block diagram showing the constitution of the circuit for displaying the battery state of the remote controller according to the present invention. As shown in FIG. 1, the system includes a remote controller 100 and a set portion 150 being controlled by the remote controller 100.

The remote controller 100 includes a battery BA1, a detecting section 101 for detecting the voltage of the battery BA1, a key matrix or key board 102 consisting of ten number keys and other function keys, a remote controller microcomputer 103 for outputting data in accordance with the inputs from the key matrix 102, a transmitter Q1 which is turned on and off under the control of the microcomputer 103, and an infrared ray LED (LED1) for transmitting the data of the microcomputer 103 in accordance with the on/off state of the transistor Q1. The detecting section 101 may be formed by using a diode D1 or an analog/digital converter. When the output of the detecting section 101 shows a lowering of the battery voltage to below a predetermined level, the microcomputer 103 loads the battery data onto the remote controller data which are transmitted to the set portion 150.

The set portion 150, as shown in FIG. 1 is intended to indicate all kinds of electronic devices that are controlled by a remote controller. In the description to follow, it will be assumed that the remotely controlled electronic device is a TV receiver. The set portion 150 includes a receiving section 151 for receiving the remote controller data, a microcomputer 152 for decoding the data received through the receiving section 151 and for controlling the operations of the TV, and a CRT driving section 153 for decoding the R, G, B and Y signals (assuming the TV is a color TV) outputted by the microcomputer 152 and for display the signals on the CRT.

Figure 2A:
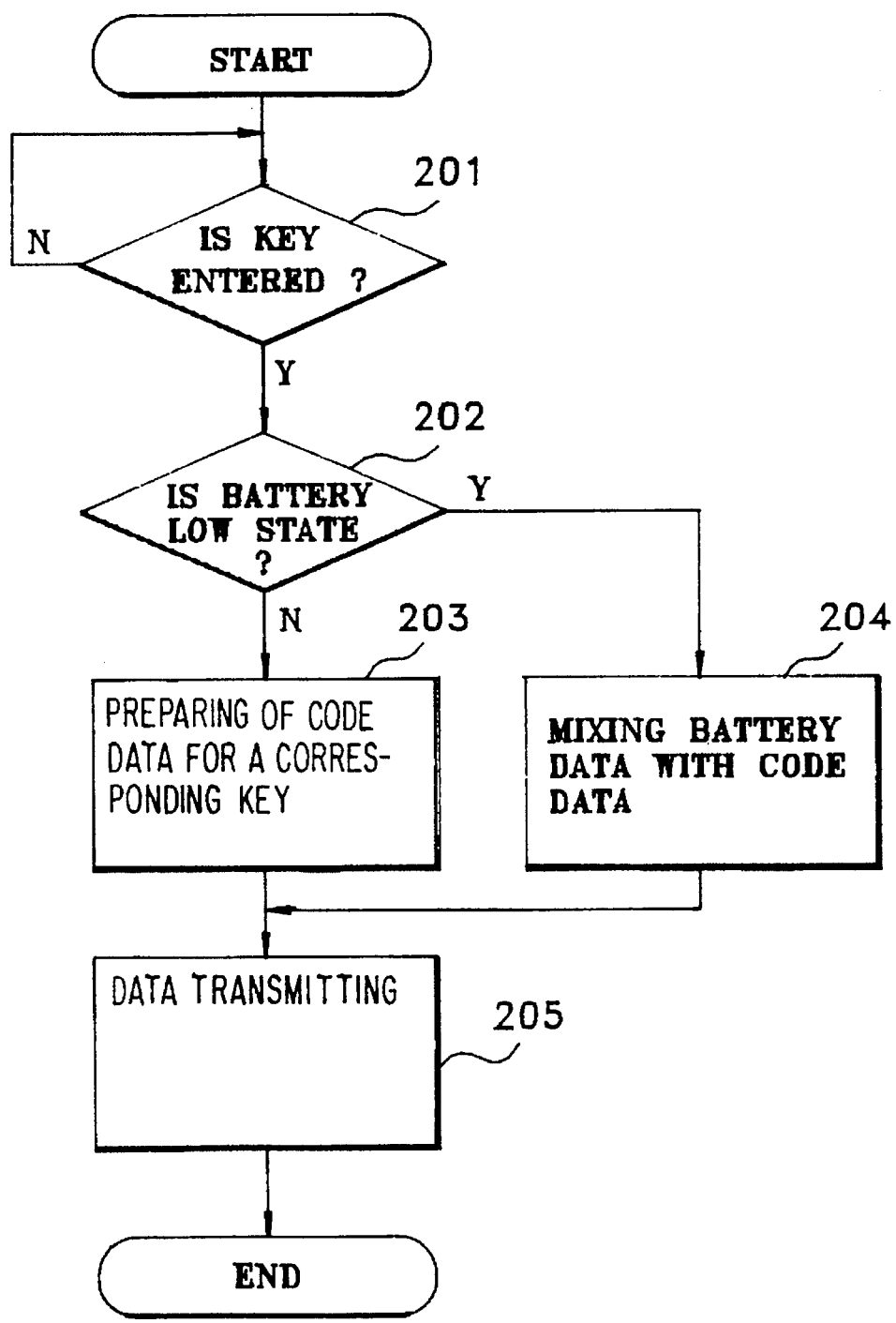
FIGS. 2A and 2B are flow charts for the method for displaying the state of the remote controller battery according to the present invention.
Figure 2B:
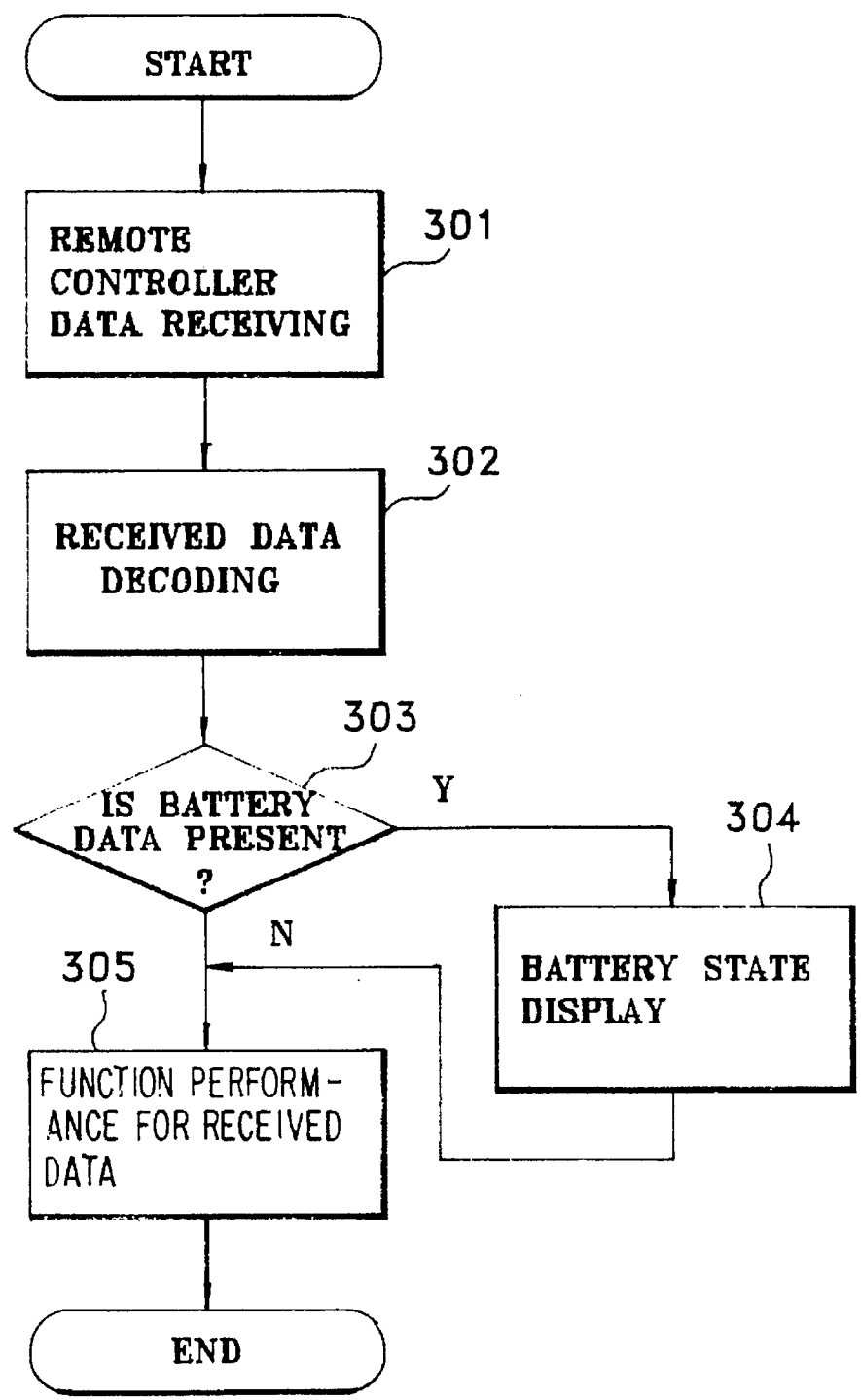

FIG. 2A is a flow chart showing the operation at the remote controller for performing the method of the present invention, and FIG. 2B is a flow chart showing the operation of the main body apparatus for performing the method of the present invention.

In the present invention constituted as described above, if the user actuates a key (by depressing the key) in the key matrix 102 of the remote controller 100, the remote controller microcomputer 103 detects the state of the battery BA1 through the detecting section 101. The detecting section 101, which consists of a diode D1, outputs a voltage representing the battery condition to an input port of the remote controller microcomputer 103 after stepping down the voltage of the battery to a certain level. If the voltage at the input port is in a low state, the remote controller microcomputer 103 recognizes this low state as indicating that the power of the battery BA1 has been exhausted to below a predetermined level.

If an analog to digital converter is used as the detecting section 101, the latter converts the voltage of the battery BA1 into digital signals representing the state of the battery power. If the digital signals represent a voltage value less than a predetermined value, the remote controller microcomputer 103 recognizes the digital signal as indicating a low battery state.

When the remote controller microcomputer 103 detects that the battery state is below the predetermined low voltage, it loads data indicating low battery condition (low battery data) onto the regular data caused by the depression of the selected key and causes the regular data and low battery data to be transmitted via the infrared ray transmitting section LED1 to the set portion 150. The method for loading the battery data on the key data can be carried out in many different ways that will be available to any one of ordinary skill in the art. That is, a format may be established based on a protocol between the transmitting part of the remote controller and the receiving part of the main body.

The microcomputer 152 of the set portion 150 (the receiving part) receives the data through the receiving section 151, and decodes the received data to determine if the received data includes battery data. If battery data is detected in the received data, the battery data is displayed on a display device after or before the main body performs the function commanded by the rest of the received data.

The display may be realized either in the form of an on-screen display (OSD) using characters, or it may be displayed through an LED or LCD which has been installed on the set portion. That is, the display may be a display of character information, such as a statement in the native language that the remote controller battery is low or exhausted, on the screen of a display device that forms a regular part of the main body, or the display may be on a display device, such an as LED or an LCD, which has been added to the main body specifically to indicated the battery condition of the remote controller.

FIG. 2A illustrates a flow chart showing the operations of the remote controller microcomputer 103. If there is a key input (step 201), the microcomputer 103 determines if the voltage of the battery is exhausted to a low state (step 202). If it is determined at step 202 that the battery is not in a low state, code data for the actuated key of the key matrix 102 is prepared (step 203), and then the prepared data is transmitted through the infrared ray transmitting section LED1 to the set portion 150 (step 205). On the other hand, if it is determined at step 202 that the battery is in a low state, a battery data code is mixed with the code data of the key entered from the key matrix (step 204) to result in the transmission of both types of data through the infrared ray transmitting section LED1 (step 205).

FIG. 2B is a flow chart showing the operation of the microcomputer 152 of the set portion 150. When remote controller data is received through the receiving section 151 (step 301), the microcomputer 152 decodes the received data (step 302). Then the microcomputer 152 determines if battery data exists in the decoded data (step 302). If it is determined at step 303 that battery data is included in the received data, the battery data is either displayed superimposed on the picture on the CRT in the form of an OSD, or displayed through an LED or LCD to inform the viewer that it is time for replacement of the battery (step 304). If it is judged at step 303 that there is no battery data, or if step 304 is carried out, the function corresponding to decoded remote controller key data is performed (step 305).

The battery data may be displayed either before, during or after the performance of the function commanded by the remaining data from the remote controller.

According to the present invention as described above, whenever a key signal is entered from the remote controller, the state of the battery is checked. If it is found that the battery voltage is lowered to such an extent as to impair the function of the remote controller, data indicating this state of the battery is loaded on the remote controller code for transmission therewith to the electronic device being controlled. The electronic device decodes the data codes from the remote controller and displays the decoded results on a display, thereby informing the user that the battery should be replaced. The user does not need to look at a display on the remote controller, but need only watch the display of the controlled device, which the user does in any event, and therefore the user can easily recognize the state of the remote controller.

What is claimed is:

1. A method for displaying the state of a remote controller battery, comprising the steps of:

detecting the battery exhaustion state upon an entered key;

mixing the battery exhaustion data with the inputted key data and transmitting them, upon determining that the battery of the remote controller is exhausted to below a predetermined level; and receiving said remote controller data to decode it, and displaying after or before a key function through a display device of a set portion, upon finding a battery data in said received remote controller data.

2. The method for displaying the state of a remote controller battery as claimed in claim 1, wherein said transmitting step is performed with a data format decided by a protocol between a transmitting part and the receiving part.

3. The method for displaying the state of a remote controller battery as claimed in claim 1, wherein said remote controller data receiving step is composed to display a battery exhaustion state in the form of an on-screen display by character display by letters.

4. The method for displaying the state of a remote controller battery as claimed in claim 1, wherein said remote controller data receiving step is displayed through a light emitting diode which has been installed on said set portion.

5. The method for displaying the state of a remote controller battery as claimed in claim 1, wherein said remote controller data receiving step is displayed through a liquid crystal display installed on said set portion.

6. In a remote control system of the type including a remote controller powered by a battery and having keys which are depressed to result in command data codes being transmitted to a controlled electronic device, said electronic device carrying out the command designated by said command data codes, a method of displaying a low battery state of said battery, comprising the steps of:

detecting at said remote controller the condition that said battery is providing power at a voltage level below a predetermined minimum level;

providing low battery data representing the detection of said last mentioned condition;

transmitting said low battery data to said controlled electronic device;

detecting said low battery data at said controlled electronic device; and displaying at said controlled electronic device, in response to a detection of said low battery data, an indication that said battery is at a voltage level below said predetermined level.

7. The method of claim 6, wherein the step of transmitting comprises transmitting said low battery data in combination with said command data codes.

8. The method of claim 7, wherein the step of detecting said battery condition comprises, sensing the actuation of any of said keys of said remote controller, and monitoring the voltage level of said battery each time actuation of a key is sensed.

9. The method of claim 6, wherein the step of detecting said battery condition comprises, sensing the actuation of any of said keys of said remote controller, and monitoring the voltage level of said battery each time actuation of a key is sensed.

10. In a remote control system of the type including a remote controller powered by a battery and having keys which are depressed to result in command data codes being transmitted to a controlled electronic device, said electronic device carrying out the command designated by said command data codes, apparatus for displaying a low battery state of said battery, comprising:

detecting means at said remote controller for detecting the condition that said battery is providing power at a voltage level below a predetermined minimum level;

a microprocessor for providing low battery data representing the detection of said last mentioned condition;

a transmitter for transmitting said low battery data to said controlled electronic device;

a receiver at said controlled electronic device for receiving data transmitted by said remote controller;

a detector at said controlled electronic device for detecting said low battery data in the data received by said receiver; and a display device at said controlled electronic device for displaying, in response to a detection of said low battery data, an indication that said battery is at a voltage level below said predetermined level.

11. The apparatus of claim 10, wherein said microprocessor comprises means for adding said low battery data to said command data codes for combined transmission by said transmitter to said controlled electronic device.

12. The apparatus of claim 11, wherein said display device is a CRT.

13. The apparatus of claim 11, wherein said controlled electronic device is a television receiver and said display device is the video display screen of said television receiver.

14. The apparatus of claim 11, wherein said display device is an LED display device.

15. The apparatus of claim 11, wherein said display device is an LCD display device.

* * * * *